D. M. BLISS.
SHAFT COUPLING
APPLICATION FILED FEB. 29, 1908.

965,131.

Patented July 19, 1910.

Witnesses:

Donald M. Bliss
Inventor

By Attorney
Albert Nathan

UNITED STATES PATENT OFFICE.

DONALD M. BLISS, OF NEW YORK, N. Y.

SHAFT-COUPLING.

965,131.   Specification of Letters Patent.   Patented July 19, 1910.

Application filed February 29, 1908. Serial No. 418,605.

*To all whom it may concern:*

Be it known that I, DONALD M. BLISS, a subject of the King of Great Britain, and a resident of New York city, county, and State, have invented certain new and useful Improvements in Shaft-Couplings, of which the following is a full, clear, and exact description, such as will enable others skilled in the art to which it appertains to carry out the same.

This invention relates broadly to mechanical connections, such as shaft couplings but more specifically, it concerns coupling devices, certain parts of which may be readily and very quickly disconnected from others thereof. Since, however, certain advantages characteristic of this invention prominently appear when it is utilized as a means instrumental in interchanging buffers, grind-stones and the like on either of the protruding ends of a power driven arbor, it will be conducive to clearness to disclose it through one of its preferred embodiments in such relation.
This invention accordingly proposes a clutch composed of complementary sections which are so formed as to permit of being quickly and easily separated or detached from each other, and at the same time be capable of being as readily coupled together. So also, these sections are so correlated and fashioned that they may firmly and truly inter-engage, thereby insuring a true running of the buffer or other tool carried by the detachable section.

In general, this invention seeks to provide a device of the nature dislosed which, from a practical operative standpoint, will possess a high degree of effectiveness and durability, and which, structurally considered, will be of the greatest possible simplicity, being composed of but few parts all of which may be manufactured at a minimum of cost and which are so correlated as to be capable of being very readily assembled to accomplish the purposes intended.

Other objects and advantages will be in part obvious from the annexed drawings and in part pointed out in the following description.

In order that this invention may be the more fully disclosed and made comprehensible to others skilled in its relating arts, drawings illustrating one of the many possible adaptations of the same are annexed as a part of this disclosure, though obviously the underlying features of this invention may be otherwise applied by modifications deducible from this disclosure and therefore comprehended within the intended scope of the claims.

In the appended drawings, corresponding parts are similarly referred to by like characters of reference throughout all the figures, of which:

Figure 1:
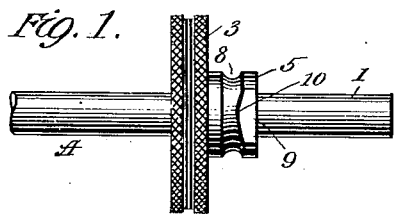
Figure 2:
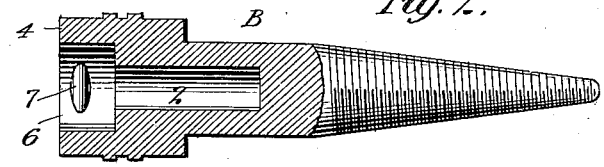
Figure 3:
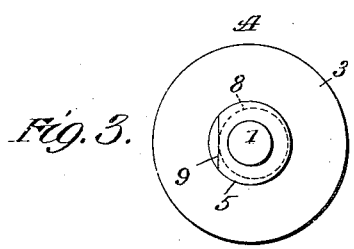
Figure 4:
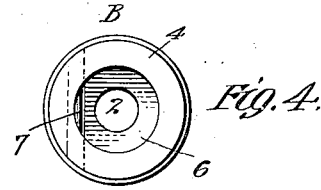
Figure 5:
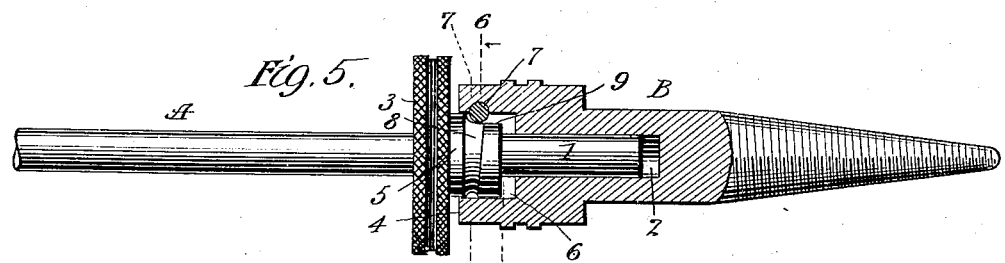
Figure 8:
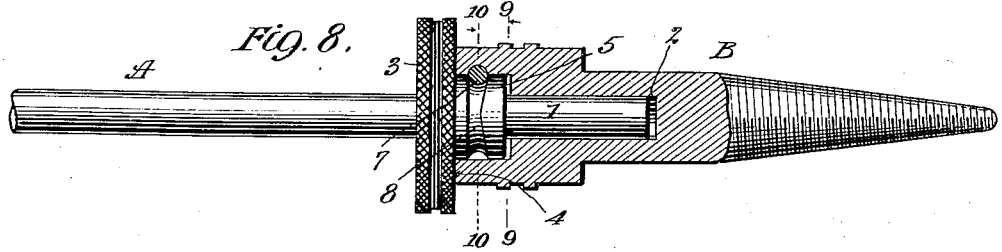
Figure 6:
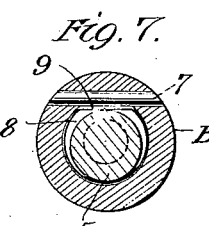
Figure 7:
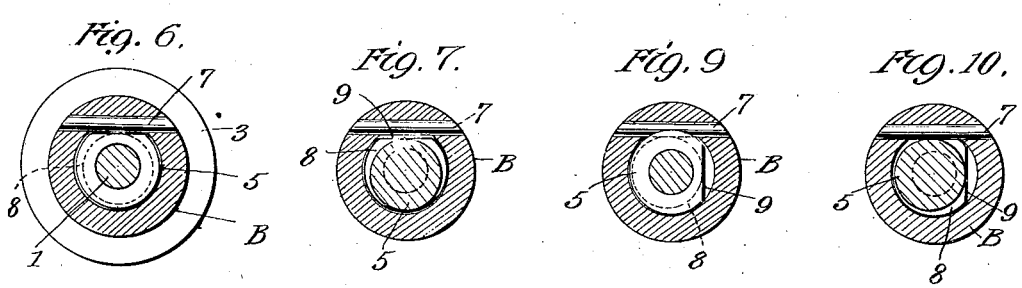
Figure 9:
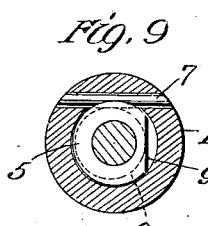
Figure 10:
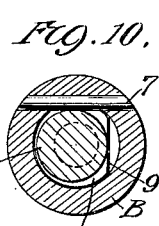

Figure 1 is a side elevation showing one of the sections of my clutch as arranged on the shaft of a power-driven arbor. Fig. 2 is a longitudinal vertical section taken through the middle or center-line of the counter-part detachable section, showing the disposition of the pin and the form of the socket containing the same. Fig. 3 is an end view of the section shown by Fig. 1, looking toward the bearing face of the knurled collar and showing in dotted lines the eccentric disposition of the groove and also the axially extending entry channel for the pin of the counter-part detachable section. Fig. 4 is an end view of the counterpart detachable section shown in sectional elevation by Fig. 2, and showing further details of the pin mounting with the rear intermediate portion of the pin backed by the body portion of the section. Fig. 5 is a partial assembly view showing the main section A in elevation and turned through a quadrant from its position in Fig. 1, and showing in section the detachable counterpart section B partly telescoped over the main section, with the pin passing through the entry channel on its way to the inter-locking groove. Fig. 6 is a transverse section taken along line 6—6 of Fig. 5 and looking to the left in the direction of the small arrows. Fig. 7 is a transverse section taken along line 7—7 of Fig. 5 looking to the right in the direction of the small arrows. Fig. 8 is a complete assembly view of the parts shown in Fig. 5 showing the inter-locking position assumed when the two sections have been turned through a partial revolution relatively to one another. Fig. 9 is a transverse section taken along line 9—9 of Fig. 8 and looking toward the left in the direction of the small arrows, showing the pin clamped or wedged in the groove at one side of the point of entry, and also showing the operative eccentricity of such groove. Fig. 10 is a transverse section taken along line 10—10 of Fig. 8, looking toward the right in the direction of the small arrows, showing the pin wedged against the underlying portion of the groove and restrained against translation by the outer peripheral wall thereof.

Referring now to the accompanying drawings, it will be seen that this invention comprises in general two detachable interchangeable sections or counter-parts A and B. These two members are preferably so formed that they may closely interfit, in order that when connected or telescoped together they will be brought into a true alinement or exact relation with one another. That is to say, independently of the interlocking features, these two complementary sections may be readily telescoped together into a relatively precise fit. In this manner, a true rotation about a center-line or axis of the detachable section will be greatly promoted. Such section may of course either permanently or temporarily carry a working implement such as a buffer, and in the former case an assortment of variously equipped detachable sections may be used in connection with each power-driven section. To this end, section A provides an elongated cylindrical extension 1 which may be the end portion of a shaft and which may be snugly received by a complementary recess 2 in the companion section B. As will be understood, the cylindrical extension 1 and its complementary recess 2 are provided with smooth contacting surfaces, thus enabling the detachable section B to slide or telescope over its counter-part section A. This facilitates the act of connecting and disconnecting these two members. Section A may also preferably provide a collar 3 rigidly secured to the shaft and against which the extreme end 4 of the counter-part section B may find an abutment, as shown more clearly by Fig. 8. It will be perceived that this also is a feature of advantage for, when these parts are pressed tightly together by the inter-locking features, the tendency is to eliminate any back-lash or like looseness and bring the parts into a more perfect alinement. It may here be observed that the collar 3, when mounted on the driving shaft, may have its outer circumference knurled and may be of sufficient diameter to enable it to be grasped by the hand after the power is turned off, thus enabling the driving shaft to be quickly brought to a stop. In like manner, the outer periphery of the detachable section B may also be knurled to enable it to be turned into inter-locking relation with the counterpart section A. So also, section B may be of a somewhat less size than the collar 3 of section A, as shown by the drawings. By having both the collar and counterpart section knurled, the separation of the two is greatly expedited and made more convenient.

That portion of my invention which more particularly constitutes the means instrumental in inter-locking or clamping together the two above described sections may now be set forth. In the preferred form, the section A is provided with a cylindrical enlargement or hub 5 extending from the abutment face or end of the collar toward the end of the shaft or extension 1, and in like manner, the abutting end 4 of the counter-part section B is centrally provided with a complementary cylindrical enlarged bore 6 adapted to snugly receive the aforesaid hub 5. One or the other of these last mentioned features will be provided with a projection or stud which may be brought into inter-locking engagement with a corresponding seat or recess, such as a groove extending peripherally in opposite directions from an entry channel provided by the other. For example, as shown by the drawings, it may be the hub 5 which is provided with the seat for receiving the projection, and such projection may conveniently extend from the inner circumferential surface of the enlarged bore 6. Obviously, the location of these features may be reversed. A suitable projection or stud may be very advantageously formed by tangentially boring a hole through the section B so as to continuously intersect for a short distance the inner circumferential surface of the enlarged bore 6. That is to say, such hole may be bored so as to form a chord with respect to the outer periphery of the counter-part section B and a partially intersected tangent with respect to the inner periphery of the enlarged bore 6. Into this hole will then be tightly driven a straight pin 7 made of hard wear-resisting material, such as steel, and the protruding ends may be ground or filed off so as to come flush with the exterior circumference of the section B and thus be not noticeable. This pin will be rigidly and immovably carried by the section B. This will constitute an inexpensive and yet highly satisfactory mode of forming the projection 7, it being apparent that the intermediate semi-cylindrical portion of the pin which protrudes from the interior circumference of the enlarged bore will act as the projecting feature of the interlocking means. It may here be recalled that such feature will at times be exposed to very considerable strains when wedged in place and accordingly should be mounted as firmly as possible so as not to work loose. This desideratum is very completely attained by my construction for the pin is not only supported at its ends in the material of the section in which they are enbedded, but its intermediate or strain receiving portion finds an ample backing also against such action. Furthermore, since only a semi-cylindrical intermediate portion protrudes, the remaining semi-cylindrical portion is held or countersunk, so to speak, in the inner periphery of the section. As a result, the intermediate portion of the pin is backed against a lateral or transverse movement, thus preventing the pin from bending under the most severe strains of the wedging of the two sections together. This feature of my invention is of great commercial advantage and goes far to make the device durable and serviceable.

As a seat for receiving and retaining the stud or pin 7, I preferably utilize the shown peculiar groove 8 which is formed in the outer periphery of the enlarged hub 5. It will be apparent, however, that such groove 8 may be varied somewhat in form and disposition within the terms of this invention. In this illustrative embodiment, such groove 8, so to speak, bears an eccentric relation to the hub 5. That is to say, groove 8 near the point of admission of the pin 7 has its maximum depth, and at a remote and usually diametrically opposite point, it has its minimum depth. In other words, the groove 8 may progressively diminish in depth, and also in width, from the point of entrance of the pin 7 to a diametrically opposite point. It is to be noted, that in the more intense aspect of this invention, this groove peripherally extends in both directions from the point of entry of the pin 7. This peculiarity overcomes the difficulty commonly inherent in separable connections for grinding tools and renders the latter interchangeably available for either end of a power driven arbor, or for either right or left handed rotations of any given spindle.

To enable the pin or projection 7 to be readily introduced into the groove 8, an axially extending channel 9 may be cut through the outer peripheral side wall adjacent the point of greatest depth of the groove 8. This forms a passageway for the admission of the pin 7 and, as a matter of fact, the pin may, so far as its projecting or exposed portion is concerned, be regarded as corresponding to the segmental or other shaped piece which has been removed from the outer wall of groove 8. Evidently such pin groove and passage-way may be variously contoured. It should here be mentioned that the outermost side wall of the groove 8 forms a peripherally extending shoulder 10 which when disposed on the hub 5 preferably inclines toward or approaches the collar 3 of section A in opposite directions, beginning at the point of entrance for the pin 7. In this illustrative embodiment of my invention, such inclination or approach occurs on both sides of the aforesaid point of entry of the pin 7. The purpose of this inclination is to wedge the pin and its associated section toward the said collar when the two sections A and B are turned relatively to one another in either direction. This operation consequently brings the end face 4 of section B tightly against the corresponding portion of the collar 3 of the other section A. At the same time, owing to the progressive decrease in depth and width of the groove 8, the under-portion of such pin will be wedged against a corresponding underlying portion of such groove, thereby further wedging or clamping the parts firmly together as is desired.

As casting light on the manner in which I wish to be understood, I desire to note that I have herein referred to a pin protruding from the "inner circumference" of one member and a groove (providing an abutment wall) in the "outer circumference" of the complementary member, these relations may be interchanged or reversed and, therefore, when I have merely used the term "circumference" or "periphery" in my appended claims, it is to be regarded as descriptive of either the inner or the outer circumference or otherwise, as the case may be.

It will thus be perceived that I have succeeded in devising a clutch well adapted to achieve the various objects and ends in view, and that my invention is notable for a characteristic simplicity arising from the few parts of which it is composed. Furthermore, these parts are none of an involved individual design, but on the contrary, are of such nature as enables them to be made with the greatest of facility by the various appliances found in all well equipped machine shops. Thus the groove 8 may be readily turned in the hub or other part by merely mounting the latter in a lathe so as to rotate about an off-center axis. From the aspect of its use and operation the sections may be very easily separated and attached by first telescoping the one over the other, and then by giving the free section a slight twist or turn, say to the extent of a quadrant. It will then be found that the two sections will readily interlock and become clamped together, thus not only preventing accidental loosening, but also insuring a perfect alinement and true running of the parts. The clutch is equally adapted to run in either direction and is consequently serviceable in many arts, especially for manufacturing jewelers and polishers. The latter frequently employ an electric motor in which the armature shaft protrudes from opposite sides of the motor. By virtue of my invention the various generally used appliances, such as grind-stones, scratch-brushes, buffers, etc., are rendered interchangeably available for either end of such shaft, notwithstanding that viewed from opposite ends or directions, the shaft would be said to rotate in different directions.

Inasmuch as the essential features of this invention could be very readily modified in form and utilized in many seemingly different constructions, I desire the foregoing disclosure to be regarded in an illustrative, rather than in a limiting sense, and I also desire it to be understood that the language of the following claims is to be interpreted as covering the generic and specific features of this invention, and all statements of the scope thereof which from the aspect of the prior art, might be said to fall there between.

Having thus described my invention, I claim as new and desire to secure by Letters Patent:

1. A device of the nature disclosed comprising in combination, a pair of detachable interfitting members, the one comprising a shaft, a hub mounted on said shaft at a distance from the end thereof, an enlarged collar arranged at the rear end of said hub and providing an end bearing face, said hub having an entry, a groove circumferentially extending from said entry and arranged to progressively decrease in capacity from said entry, the counterpart member having an elongated socket for said shaft beyond said hub and having an enlarged bore for snugly receiving said hub, said member also having a projection within said enlarged bore.

2. A device of the nature disclosed comprising in combination, a pair of detachable interfitting sections, the one comprising a shaft, an enlarged collar fixed to said shaft at a distance from the end thereof and providing an annular abutment end-face, a hub-shaped member extending from said collar toward the end of said shaft, the counterpart section having a socket-like member adapted to snugly receive said hub-shaped member and having an annular end adapted to abut said collar, said section having an elongated bore for receiving the protruding end of said shaft, one of said members having a periphery provided with an axially extending entry channel and a wedging groove circling in opposite directions from said entry channel, and a pin projecting from a contacting periphery of said other member adapted to be received by said oppositely extending groove to wedge said sections together by a partial relative rotation thereof in either direction.

3. A device of the nature disclosed, comprising in combination, a pair of detachable interfitting members, the one comprising a shaft, a hub mounted on said shaft at a distance from the end thereof, an enlarged collar arranged at the rear end of said hub and providing an end bearing face, said hub having a groove circumferentially extending in opposite directions from a point of entry and arranged to progressively decrease in capacity from said entry, the counterpart member having an elongated socket for the portion of said shaft extending beyond said hub and having an enlarged bore for snugly receiving said hub, said counterpart member also having an aperture extending in the direction of a chord and having an intermediate intersection with the inner circumference of said enlarged bore, and a straight pin tightly fitted within said aperture, whereby an intermediate portion will project from the inner circumference of said enlarged bore and be partially embedded in and supported at its rear by the annular wall thereof.

DONALD M. BLISS.

Witnesses:
WILFRID M. HENNESSY,
A. A. WOODS.